United States Patent Office 3,349,322
Patented Oct. 24, 1967

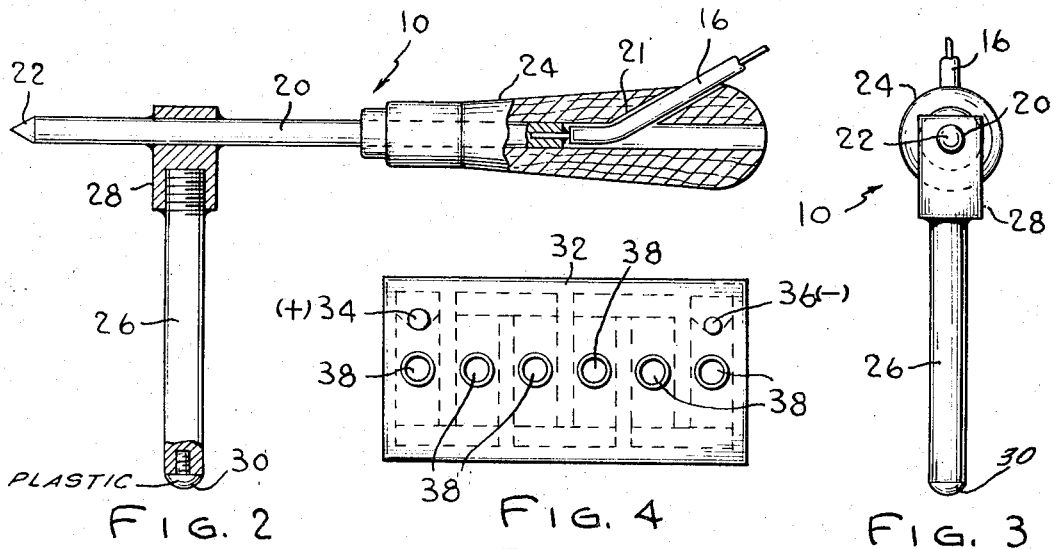
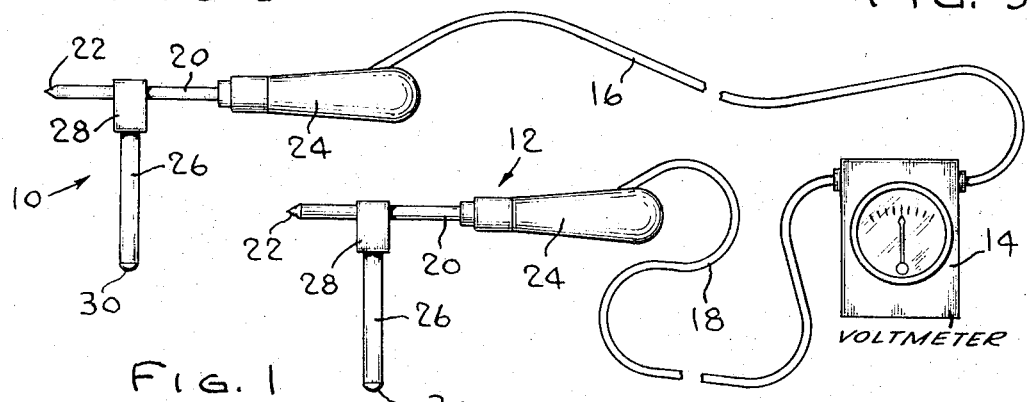
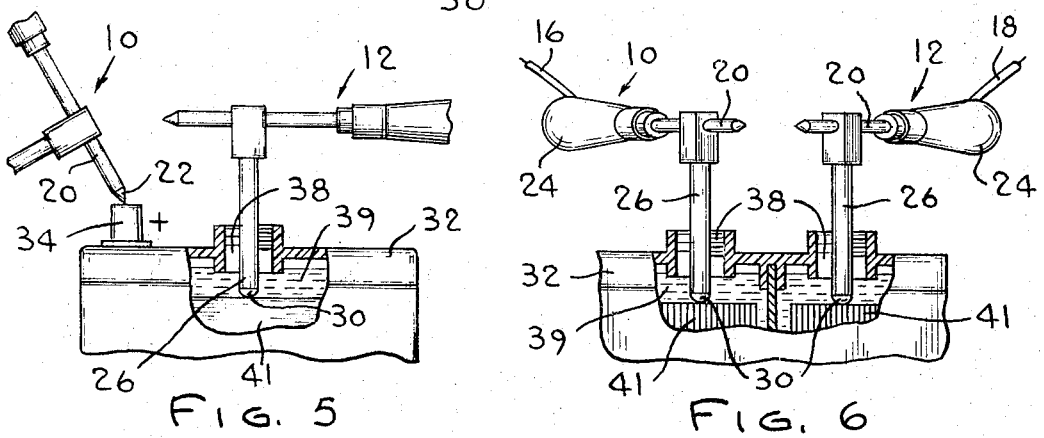

3,349,322
METHOD OF AND APPARATUS FOR MEASURING STORAGE BATTERY CELL VOLTAGES
Paul V. Lowe, Milwaukee, Wis., assignor to Globe-Union Inc., Milwaukee, Wis., a corporation of Delaware
Filed Aug. 26, 1963, Ser. No. 304,411
2 Claims. (Cl. 324—29.5)

This invention relates to a method of and apparatus for testing a storage battery of the type wherein the individual cells are electrically connected to each other internally of the battery case. More particularly, the test procedure of this invention relates to the measurement of individual cell voltages of such an intercell connected battery.

In a conventional battery the cells are electrically connected together by means of connecting links located on the top of the battery cover. In such a battery the individual cells can be checked by contacting the externally positioned links (and terminals) with a voltmeter or other test device. In recent years the production of intercell connected batteries has increased. The object of this invention is to provide a simple, accurate and easily performed method of testing an intercell connected battery and to provide apparatus for performing such method which is easy to manipulate and of reasonable cost.

Other objects and advantages will be pointed out in, or be apparent from the description and claims, as will obvious modifications of the single embodiment shown in the drawing, in which:

FIG. 1 is a side elevation view of apparatus of the type which may be used in the practice of the method of this invention;

FIG. 2 is an enlarged side elevation view (with parts broken away) of one of the test probes shown in FIG. 1;

FIG. 3 is an end view of the probe shown in FIG. 2;

FIG. 4 is a top plan view of an intercell battery of the type which the test method of this invention is adapted to be applied; and FIGS. 5 and 6 are side elevation views (with portions broken away) showing how the test apparatus of FIG. 1 is used to test an intercell battery.

Apparatus suitable for use in the practice of this invention is shown in the drawing and includes positive and negative probes 10 and 12, respectively, electrically connected to a voltmeter 14 of conventional design by means of suitable conductors 16 and 18. Probes 10 and 12 other than for the appropriate polarity markings thereon are of identical construction and include a terminal contacting member 20 having a pointed end 22 and mounted in a handle 24 of insulating material. An electrolyte contacting member 26 is fastened to pointed member 20 at right angles therewith by means of a fitting 28 as shown in FIG. 2. Member 20 is inserted through fitting 28 and welded thereto and rod member 26 is threaded into the fitting as shown. Member 20 is preferably of cadmium plated steel and rod 26 is preferably of cadmium and has an acid resistant plastic screw 30 fitted in the end thereof. Conductors 16 and 18 are connected to the ends of members 20 through openings 21 in handles 24 as shown in FIG. 2. Openings 21, it is noted, extend upwardly at an angle from the axis of handle 24 in a direction substantially opposite from that in which rod 26 extends to facilitate handling of the probes.

FIG. 4 shows a 12-volt intercell connected battery 32 of the type to be tested by the method of this invention. Battery 32 is provided with positive and negative terminals 34 and 36, respectively, and a vent opening 38 for each of the six cells as shown and further includes battery plates 41 and electrolyte 39 therein.

The procedure followed for reading the voltages of a 12-volt intercell connected battery 32 like that shown in FIG. 4 is as follows:

(a) Place the pointed end 22 of the positive probe 10 on the positive terminal post 34 and insert the rod 26 of the negative probe 12 through vent 38 into the electrolyte 39 of the first or positive cell as shown in FIG. 5 and record this reading.

(b) Place the rod 26 of the positive probe 10 into the electrolyte 39 of the first or positive cell and the rod 26 of the negative probe 12 into the electrolyte of the next or second cell, as shown in FIG. 6, and record this reading.

(c), (d), (e) and (f) Repeat step (b) to get four more readings by moving the probes to the next cells keeping the positive probe 10 always in the cell electrically nearest the positive terminal cell 34 and record each of these four readings.

(g) The final reading is taken with the rod 26 of the positive probe 10 in the electrolyte of the sixth or positive cell and with the pointed end 22 of the negative probe 12 on the negative terminal post 36 in a manner similar to that shown in FIG. 5. The reading obtained is then algebraically added to the reading obtained in step (a) above. In other words, if the needle on the cell voltmeter 14 moves to the right or to the plus side of zero, add it to the first cell reading.

Example.—Meter reading in step (g) is +.05 and meter reading in step (a) was 2.55. Correct reading is 2.55+.05=2.60.

If the needle moves to the left or minus side of zero, subtract such reading from the first cell reading.

Example.—Meter reading in step (g) is −.05 and meter reading in step (a) was 2.55. Correct reading is 2.55−.05=2.50.

If no reading on meter is obtained in step (g) the first cell reading obtained in step (a) is correct and no correction is necessary.

It is noted as shown in FIGS. 5 and 6 that when rods 26 of the probes 10 and 12 are inserted into the electrolyte 39 of the battery the screws 30 thereon of insulating material will contact the top of the battery plates 41 to prevent electrical contact between the rods and the plates to thus insure an accurate reading.

The above described procedure may be usefully employed in several types of conventional storage battery test procedures wherein the objective is to measure individual cell voltages. Such test procedures include the "open circuit," "starting load" (discharge) and "on-charge" types.

As an example of the specific test results obtained by the use of the method of this invention the following is a list of test readings obtained by testing a group of 6- and 12-volt batteries in an "on-charge" test wherein each 6-volt battery was tested while being charged with 75 amps. and each 12-volt battery was tested while being charged with 40 amps.

| Battery No. | Corrected Cell Readings (volts) | | | | | | Max. Variance Between Cells |
|---|---|---|---|---|---|---|---|
| 3H | 2.64 | 2.64 | 2.64 | | | | 0 |
| 5H | 2.61 | 2.58 | 2.63 | | | | .05 |
| 6H | 2.59 | 2.67 | 2.67 | | | | .08 |
| 7H | 2.57 | 2.56 | 2.62 | | | | .06 |
| 8H | 2.65 | 2.65 | 2.69 | | | | .04 |
| 12H | 2.62 | 2.63 | 2.55 | 2.60 | 2.56 | 2.62 | .08 |
| 18H | 2.74 | 2.77 | 2.73 | 2.75 | 2.72 | 2.75 | .05 |
| 19H | 2.44 | 2.39 | 2.50 | 2.53 | 2.56 | 2.50 | .17 |
| 1M | 2.60 | 2.58 | 2.57 | | | | .03 |
| 2M | 2.66 | 2.66 | 2.67 | | | | .01 |
| 3M | 2.82 | 2.85 | 2.85 | | | | .03 |
| 5M | 2.56 | 2.49 | 2.58 | | | | .09 |
| 6M | 2.58 | 2.67 | 2.65 | | | | .09 |
| 8M | 2.67 | 2.56 | 2.61 | | | | .11 |
| 9M | 2.61 | 2.65 | 2.67 | | | | .06 |
| 16M | 2.46 | 2.49 | 2.47 | 2.50 | 2.48 | 2.45 | .05 |
| 17M | 2.60 | 2.72 | 2.52 | 2.60 | 2.47 | 2.50 | .25 |
| 18M | 2.60 | 2.64 | 2.61 | 2.61 | 2.53 | 2.58 | .11 |
| 20M | 2.66 | 2.55 | 2.57 | 2.59 | 2.58 | 2.61 | .11 |
| 22M | 2.49 | 2.71 | 2.60 | 2.61 | 2.60 | 2.47 | .24 |

While the reject criteria will vary depending upon other test measurements, age of battery, etc., a reasonable criteria applied to the above readings would result in rejection of all batteries tested having a maximum variance between cells of more than .10 volts. By such standard, batteries 19H, 8M, 17M, 18M, 20M and 22M would be rejected.

In describing this invention reference is made to the measurement of "individual cell voltages." It should be understood that such term refers to a measurement of the potential between the electrolyte of one cell and the electrolyte of the next adjacent cell (and between the electrolyte and terminal of the two end cells). This approach should not be confused with the standard approach wherein batteries are tested by measuring the potential between the positive and negative plates of each individual cell.

Although but one embodiment of the present invention has been illustrated and described, it will be apparent to those skilled in the art that various changes and modifications may be made therein without departing from the spirit of the invention or from the scope of the appended claims. For example, while the method and apparatus of this invention are particularly well adapted for testing an intercell connected battery it should be understood that such method and apparatus can also be used to test batteries having external connections between adjacent cells.

I claim:
1. A method of testing a multi-cell storage battery, each cell of which is provided with battery plates and electrolyte, said storage battery further characterized by one end cell having an exposed positive terminal, an opposite end cell having an exposed negative terminal and at least one intermediate cell between said end cells, said method comprising the following nonsequential steps:
  (a) measuring the potential difference between the electrolytes of a pair of adjacent cells of the battery by inserting a first conductor into the electrolyte of one cell and inserting a second conductor into the electrolyte of the adjacent cell, said conductors being electrically connected to an electrical measuring means with both of said conductors being immersed in the separate electrolytes of the respective cells at the same time; and
  (b) repeating step (a) for each pair of adjacent cells of the battery.

2. A method of testing a multi-cell storage battery, each cell of which is provided with battery plates and electrolyte, said storage battery further characterized by one end cell having an exposed positive terminal, an opposite end cell having an exposed negative terminal and at least one intermediate cell between said end cells, said method comprising the following nonsequential steps:
  (a) measuring the potential difference between the electrolytes of a pair of adjacent cells of the battery by inserting a first conductor into the electrolyte of one cell and inserting a second conductor into the electrolyte of the adjacent cell, said conductors being electrically connected to an electrical measuring means with both of said conductors being immersed in the separate electrolytes of the respective cells at the same time;
  (b) repeating step (a) for each pair of adjacent cells of the battery;
  (c) measuring the potential difference between the positive terminal of said one end cell and the electrolyte of said one end cell by inserting a first conductor into the electrolyte of said one end cell and simultaneously making contact between a second conductor and said positive terminal while said conductors are electrically connected to an electrical measuring means; and
  (d) measuring the potential difference between the negative terminal of said opposite end cell and the electrolyte of said opposite end cell by inserting a first conductor into the electrolyte of said opposite end cell and simultaneously making contact between a second conductor and said positive terminal while said conductors are electrically connected to an electrical measuring means.

References Cited

UNITED STATES PATENTS

| | | |
|---|---|---|
| 1,338,170 | 4/1920 | Carlon. |
| 1,494,625 | 5/1924 | Pierce. |
| 2,690,544 | 9/1954 | Hauburlin _____ 324—29.5 XR |
| 2,988,590 | 6/1961 | Andre _____ 324—29.5 X |
| 3,060,374 | 10/1962 | Strain _____ 324—29.5 |

ARCHIE R. BORCHELT, *Primary Examiner.*

WALTER L. CARLSON, C. F. ROBERTS, *Examiners.*